(No Model.) 2 Sheets—Sheet 1.
W. GEIPEL.
STEAM TRAP.
No. 560,491. Patented May 19, 1896.
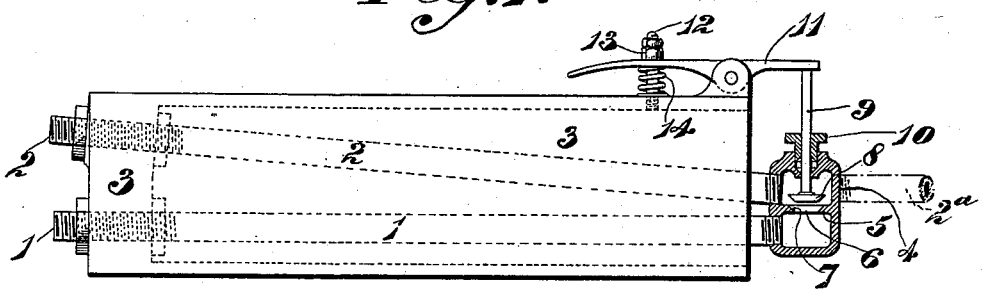
Fig. 1.
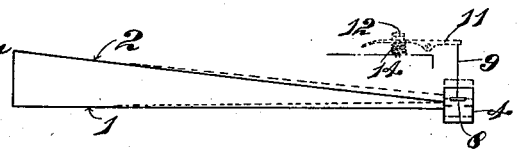
Fig. 1ª.
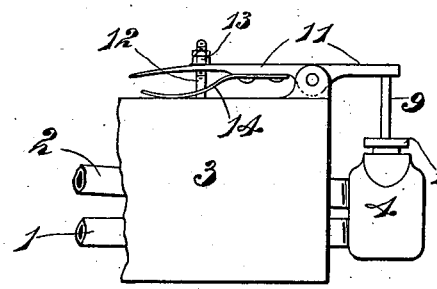
Fig. 2.
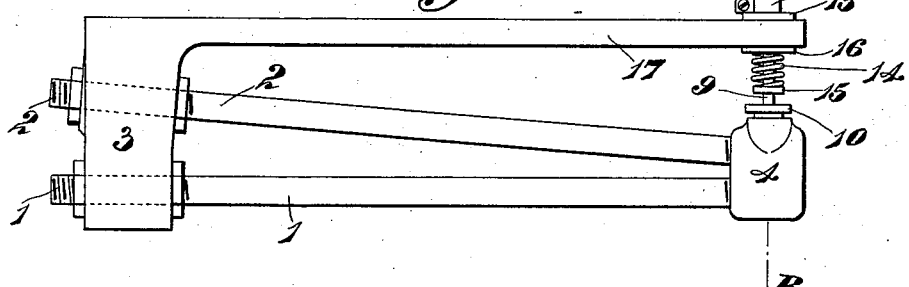
Fig. 3.
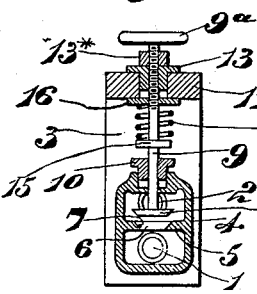
Fig. 3ª.
Witnesses
C. M. Werle
Hubert E. Peck
Inventor:
Wm Geipel
per J. E. Duffy
Attorney
ANDREW B. GRAHAM, PHOTO-LITHO. WASHINGTON, D.C.

(No Model.) 2 Sheets—Sheet 2.
W. GEIPEL.
STEAM TRAP.
No. 560,491. Patented May 19, 1896.
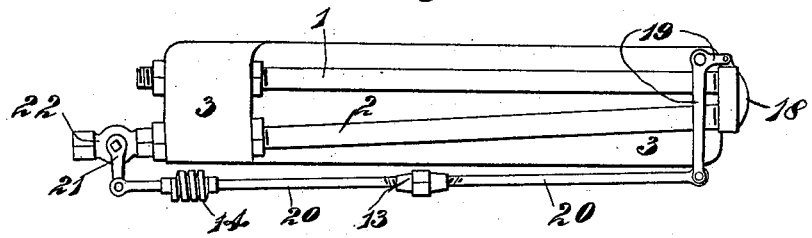
Fig. 4.
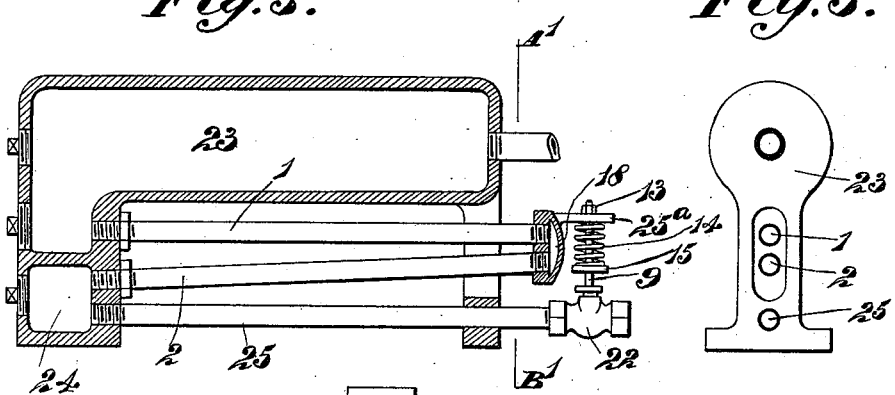
Fig. 5.   Fig. 5.ª
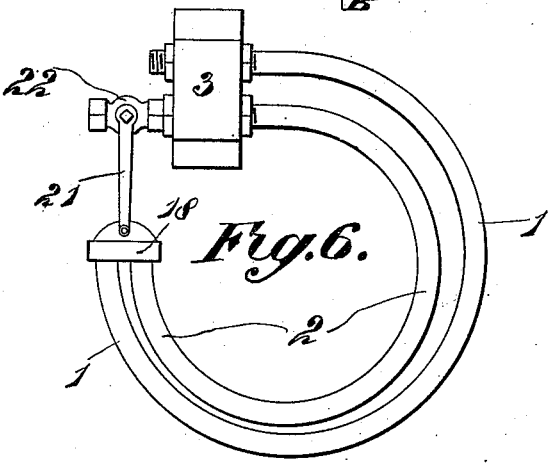
Fig. 6.
Witnesses.
C. M. Werle
Hubert Peck
Inventor:
Wm Geipel

UNITED STATES PATENT OFFICE.

WILLIAM GEIPEL, OF LONDON, ENGLAND.

STEAM-TRAP.

SPECIFICATION forming part of Letters Patent No. 560,491, dated May 19, 1896.

Application filed March 4, 1895. Serial No. 540,465. (No model.) Patented in England April 18, 1893, No. 7,860, and November 9, 1894, No. 21,571; in France February 14, 1895, No. 245,120, and in Belgium February 14, 1895, No. 114,112.

*To all whom it may concern:*

Be it known that I, WILLIAM GEIPEL, a subject of the Queen of Great Britain and Ireland, residing at Blackheath, London, in the county of Kent, England, have invented Improvements in Steam-Traps, (for which I have obtained Letters Patents in Great Britain, No. 7,860, dated April 18, 1893, and No. 21,571, dated November 9, 1894; in France, No. 245,120, dated February 14, 1895, and in Belgium, No. 114,112, dated February 14, 1895,) of which the following is a specification.

This invention relates to improvements in steam-traps of the kind known as "expansion-traps," by means of which water of condensation is allowed to escape from steam-pipes, cylinder-jackets, and other receptacles, while any considerable escape of steam is automatically prevented; and it has for its object to provide steam-traps of this kind which shall be more reliable and durable than those heretofore in use and which shall also be readily accessible and capable of being easily repaired.

In the accompanying drawings, Figure 1 is a side elevation, partly in section, showing a steam-trap constructed according to this invention. Fig. 1ª is a diagram to illustrate its working, and Fig. 2 is a part side elevation showing a slightly-modified arrangement. Fig. 3 is a side elevation, and Fig. 3ª a cross-section, on the line A B of Fig. 3; Fig. 4, a side elevation; Fig. 5, a side elevation, partly in section, and Fig. 5ª a cross-section, on the line A' B' of Fig. 5; and Fig. 6, a side elevation showing further modified constructions of steam-traps according to this invention.

The steam-trap shown in Fig. 1 comprises two tubes 1 and 2, one end of each of which is securely fixed to the frame 3 of the trap, while the opposite ends, which are unsupported by the said frame, are secured to a valve-casing 4, formed with a partition 5, that separates the two tubes and in which there is an opening 6, surrounded by a valve-seat 7, which may be of any well-known renewable type. The two tubes, which are made of metals having widely-differing coefficients of expansion, are arranged at an angle to each other, the tube 1, which is preferably of brass or copper, being adapted to be placed in communication with the conduit or vessel from which water is to be allowed to escape, while the tube 2, which is preferably of iron, is adapted to be placed in communication with a discharge-pipe.

8 is a valve to control the opening 6. It is carried by a spindle 9, that passes through a gland 10 and abuts against one end of a lever 11, pivoted upon the frame 3, and the other end of which serves as a handle.

It is found that if the valves of expansion-traps of the kind heretofore used be set to work with a certain steam-pressure and this pressure, and therefore the temperature, happen to be exceeded, there is a corresponding excess amount of expansion and consequently an excess pressure between the valve and its seat, which causes straining of the trap or damage to the valve-face, or the trap may in this way have a permanent set imparted to it, so that it requires readjustment before it will again operate to prevent the discharge of steam at the lower pressure; otherwise there will be continual leakage of steam. To obviate this disadvantage, the valve 8, the extent of opening of which is made adjustable, is so arranged and supported according to this invention that it will yield when subjected to undue pressure. For this purpose in the arrangement now being described there is fixed to the frame 3 a screw-threaded stud 12, whose outer end extends through a slot in the handle of the lever 11 and is provided with a nut 13, and surrounding the said stud is a coiled spring 14, that presses the handle against the nut 13, so as to permit the valve to move to a predetermined extent from its seat when the tubes contain water, but which is capable of being compressed by the said lever 11 to allow the valve to yield when necessary.

The action of the steam-trap is as follows: When the tubes are cool or comparatively cool, which will be the case when they contain water, they will occupy the position shown approximately in full lines in the diagram Fig. 1ª, the valve being open; but upon the water being discharged the tubes will become filled with steam and thus heated to a considerable temperature, and the brass or copper tube 1 expanding to a greater extent than the iron tube 2 the tubes will be caused to assume the positions indicated approximately by the dotted lines in Fig. 1ª, the valve-seat being then pressed against the said valve, so that further escape of steam through the tubes will be prevented. Upon water again collecting in the tube 1 the tubes will assume their original position and communication between them will be again opened, thus again allowing the escape of water, and so on. Should the expansion and consequent movement of the tubes 1 and 2 exceed the predetermined limit when the tube 1 is heated by steam, the pressure of the seat upon its valve will force the latter back against the action of the spring 14. Straining and the necessity for readjustment of the parts are thus obviated.

To set the trap so as to cut off the escape of steam at any desired pressure, the normal extent of opening of the valve is adjusted by screwing the nut 13 along the stud 12. By operating the lever 11 by hand the valve 8 can be left free to move away from its seat 7, so as to permit steam to blow through the trap for any desired length of time, a stop or catch being provided, if necessary, to engage the lever and hold the valve in its open position.

Fig. 2 illustrates a steam-trap constructed as above described, except that a leaf-spring 14, secured to the handle of the lever 11 and bearing against the frame 3, is used instead of the coiled spring shown in Fig. 1.

In the modified construction of steam-trap shown in Figs. 3 and 3ª a coiled spring 14 is arranged between a fixed collar 15 on the valve-spindle 9 and a washer 16, that bears upon the upper side of a bracket 17, formed in one piece with or carried by the frame 3 of the trap and through which the said spindle extends. The spindle is provided with a flanged nut 13, which, by its flange abutting against the under side of the bracket, prevents the valve too nearly approaching its seat 7. The spindle is also provided with an adjustable lock-nut 13*, which serves as a guide or stop to facilitate the accurate resetting of the valve after blowing through the trap. The operation of this trap is the same as that hereinbefore described with reference to Fig. 1, except that to blow through the trap the valve-spindle 9 must be screwed up by the hand-wheel 9ª.

In the arrangement shown in Fig. 4 the free ends of the tubes 1 and 2 are connected by means of a junction-box 18, that is connected by a bell-crank lever 19, pivoted to the frame 3 of the trap, a link 20, and lever-arm 21 to the plug of a cock 22, which is secured to the discharge end of the tube 2 and takes the place of the valve in the hereinbefore-described arrangements. I may make the link 20 in two parts, connected, as shown, by a spring 14, the stiffness of which is such that it will only yield under a pressure exceeding that required to close the cock. The length of the link may be varied by an adjusting-nut 13 for setting the trap to any desired working pressure. The operation is the same as in the previous examples.

In Figs. 5 and 5ª the steam-trap is shown combined with a receptacle 23, (shown in section,) in which the water may collect in the event of the pipe or vessel to which the trap is applied becoming charged from any cause with an unusual quantity of water. In this arrangement the tube 2 discharges into a compartment 24, from which leads a pipe 25, the outer end of which is provided with a valve 22, as shown. The spindle 9 of the valve proper passes through a slot in a bracket 25ª, projecting from the junction-box 18, and is provided with an adjusting-nut 13, a spring 14 being arranged between a collar 15 on the valve-spindle 9 and the said bracket. The operation of this arrangement needs no further description.

As will be readily understood, steam-traps according to this invention may be variously modified. Thus the tube 2 may in some cases, as in the arrangements shown in Figs. 1, 2, and 3, be replaced by a tie-rod, the opening and closing of the valve being in this case caused by the expansion of the tube 1 alone. In such an arrangement the valve-case 4 would be provided with an outlet for water and steam, as shown at 2ª in Fig. 1.

In some cases the coiled or flat springs 14 may be dispensed with, a part of the frame of the trap carrying the valve-spindle or the lever 11, Figs. 1 and 2, being then made elastic or springy, or the tubes 1 and 2 may be made of curved form, as illustrated in Fig. 6, so that besides expanding unequally like the straight tubes to close the cock or valve 22 they will themselves form springs that will yield and prevent the valve and valve-face and other parts from being injured by excessive expansion.

Valves with springs and adjusting wheels or levers according to this invention can be applied to expansion steam-traps of other constructions than those of the kind herein described.

What I claim is—

1. A steam-trap comprising two lengths of metal connected together so as to be free to expand at one end and fixed at their other ends, having different coefficients of expansion, and one of which is tubular and provided with an inlet for steam and water of condensation at one end and an outlet at the other end, and a valve and valve-seat adapted to control the flow of fluid through said tubular length of metal and one of which is normally fixed while the other is arranged to be moved in relation thereto by differential expansion and contraction of the said two lengths of metal, substantially as herein described.

2. A steam-trap comprising two tubes each fixed at one end connected together and free to expand at the other end and formed of metals having different coefficients of expansion, and a valve and valve-seat arranged to control the flow of water of condensation and steam through said tubes, one of these parts being normally fixed and the other being arranged to be moved toward it by differential expansion of said tubes, substantially as herein described.

3. A steam-trap comprising two tubes each fixed at one end, connected together at their other end through a valve-case so as to be free to expand, and formed of metal having different coefficients of expansion, and a normally-fixed spring-controlled valve arranged within said valve-case so as to control the communication between said tubes, substantially as herein described for the purpose specified.

4. In an expansion steam-trap, the combination with a movable valve-seat and normally stationary valve therefor, of a hand-lever pivoted to the body or framing of the trap and connected to said valve, a stud with adjustable nut for limiting the movement of said hand-lever in one direction, and a spring arranged between said lever and body or framing so as to permit of said lever moving in the opposite direction, substantially as described for the purpose specified.

5. A steam-trap comprising the tubes 1 and 2 formed of metals having different coefficients of expansion, a frame or support to which said tubes are fixed at one end, a valve-case 4 connecting the other ends of said tubes, a valve 8 located in said valve-case, a hand-lever 11 pivoted to said frame or support and connected to said valve, a stud 12 with nuts 13 for limiting the movement of said hand-lever in one direction, and a spring 14 arranged between said lever and frame so as to permit of said lever moving in the opposite direction substantially as herein described for the purpose specified.

In testimony whereof I have signed my name to this specification in the presence of two subscribing witnesses.

WILLIAM GEIPEL.

Witnesses:
EDMUND S. SNEWIN,
WM. V. BROWN.